Figure 1:
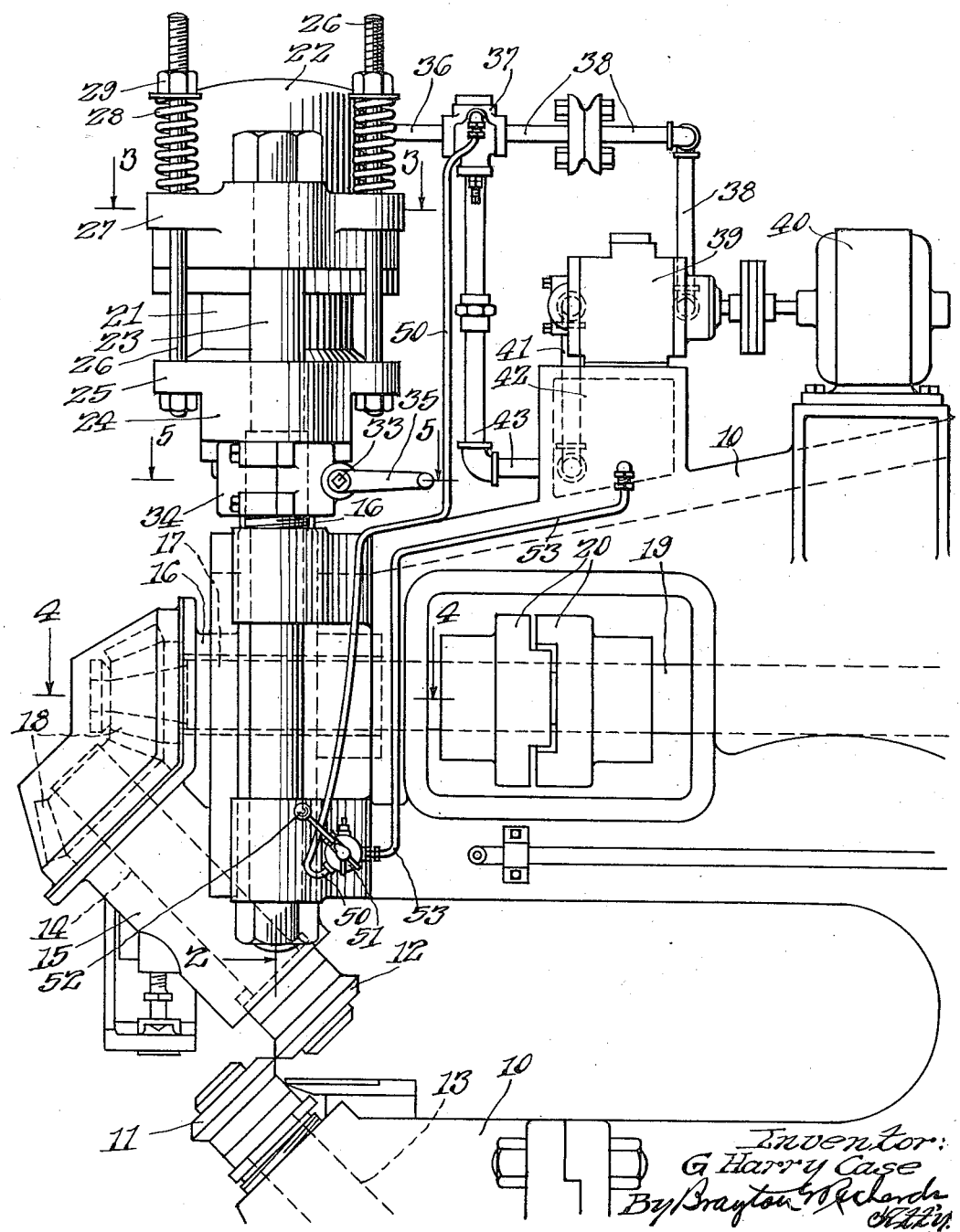

March 10, 1936.  G H. CASE  2,033,181
ROTARY SHEAR
Filed Sept. 8, 1933   2 Sheets-Sheet 1

March 10, 1936.  G H. CASE  2,033,181

ROTARY SHEAR

Filed Sept. 8, 1933  2 Sheets-Sheet 2

Inventor:
G Harry Case
By Brayton Richards
Att'y

Patented Mar. 10, 1936

2,033,181

UNITED STATES PATENT OFFICE 2,033,181

ROTARY SHEAR

G Harry Case, Moline, Ill.

Application September 8, 1933, Serial No. 688,601

21 Claims. (Cl. 164—60)

The invention relates to improvements in rotary shears, and has for its primary object the provision of an improved machine of the character indicated which is capable of economical construction and highly efficient in use.

Another object of the invention is the provision of a machine of the character indicated so constructed and arranged as to prevent or minimize danger of injury or breaking in the normal operation thereof.

Another object of the invention is the provision of an improved machine of the character indicated provided with improved means for adjusting and holding the rotary shear elements in cooperating relationship and so constructed and arranged as to yield and recede from each other in case of undue load or resistance.

Other objects will appear hereinafter.

The invention consists in the combinations and arrangements of parts hereinafter described and claimed.

The invention will be best understood by reference to the accompanying drawings forming a part of this specification, and in which Fig. 1 is a partial side view of a machine embodying the invention;

Fig. 2 a partial vertical transverse section taken substantially on line 2—2 of Fig. 1;

Fig. 3 a partial transverse section taken substantially on line 3—3 of Fig. 1;

Fig. 4 a partial transverse section taken substantially on line 4—4 of Fig. 1;

Fig. 5 a partial transverse section taken substantially on line 5—5 of Fig. 1;

Fig. 6 an enlarged vertical section taken through an automatic relief valve employed in the construction, said section being taken substantially on line 6—6 of Fig. 7; and Fig. 7 a section of said valve taken substantially on line 7—7 of Fig. 6.

The embodiment of the invention illustrated in the drawings comprises a suitable frame 10 having angularly arranged rotary shear elements 11 and 12 mounted therein for cooperation with each other. The shear element 11 is the stationary shear element of the machine and is mounted on a suitable inclined driving shaft 13 mounted in frame 10, as indicated.

Shear element 12 is the adjustable shear element of the machine and is mounted on inclined driving shaft 14 mounted in a suitable bearing 15 carried by an adjusting head 16 mounted in suitable guide-ways in the frame of the machine, as best indicated in Fig. 4. The adjusting head 16 carries a driving shaft 17 connected by beveled gears 18 with the driving shaft 14 for operation of the latter. The driving shaft 17 is driven by another driving shaft 19 connected thereto by a flexible coupling 20, which permits of vertical adjustments of the parts. The shafts 13 and 19 are suitably connected to be driven by means of a suitable electric motor or other source of power, not shown. The arrangement is such as to cause the constant rotation of the shear elements 11 and 12 and permit of the usual adjustments of the latter. So much of the machine as has already been described constitutes an old and well-known machine for the purpose and constitutes no part of my present invention except insofar as the same cooperates with the parts to be presently described.

The adjusting head 16 is rigidly secured as indicated to the lower end of a hydraulic ram piston 21 operating in cylinder 22 rigidly mounted at the upper end of two guide rods 23 secured in the frame 10, as best shown in Fig. 2. At its lower end the piston 21 carries laterally extending guide lugs 24 sliding on the guide rods 23. The guide lugs 24 are provided with ears 25 carrying spring rods 26 operating freely through perforated ears 27 on the sides of the ram cylinder 22. The rods 26 also carry compression springs 28 and adjusting nuts 29 for adjusting the compression of the springs 28, as indicated. By this arrangement it will be observed that the adjusting head 16, and consequently the rotary shear element 12, will be normally held in elevated position by means of the springs 28, and the compression of these springs may be adjusted to accomplish this purpose.

As best shown in Figs. 2 and 5, adjusting nuts 30 are threaded at 31 on the guide rods 23 and carry on their peripheries worm wheels meshing with worms 32 on an adjusting shaft 33 mounted in bearings 33' on the sides of split blocks 34 enclosing the nuts 30. The adjusting shaft 33 is provided with a crank handle 35 to facilitate manipulations thereof. By this arrangement it will be noted that the nuts 30 may be simultaneously adjusted on the rods 23 and will serve as stops to limit the approach of the rotary shear element 12 to the stationary shear element 11.

The hydraulic ram cylinder 22 is supplied with operating oil or other liquid through a pipe 36 leading to a relief valve casing 37 which, in turn, is connected by a pipe 38 with the outlet of a pump casing 39 operated by an electric motor 40.

The inlet of the pump casing 39 is connected by a pipe 41 with a reservoir 42 holding oil or other liquid for the operation of the ram cylinder 22. A by-pass pipe 43 leads from the reservoir 42 to the lower end of the relief valve casing 37, as shown.

As best shown in Figs. 6 and 7, a vertical yieldable valve 44 is arranged in the valve casing 37 to control the upper end of the by-pass pipe 43. The valve 44 carries a piston head 45 provided with a bleeder opening 45' and operating in the cylinder 46, said valve being yieldingly held to its seat by means of a compression spring 47, as indicated. A relief passage 48 leads from the top of the cylinder 46 to the opening in the valve casing 37 just above the top of the by-pass pipe 43 and is controlled by an adjustable spring-held ball valve 49, as indicated. The relief passage 48 is connected as shown by a pipe 50 with a valve 51 controlled by a hand lever 52, and a pipe 53 leads from the valve 51 to the reservoir 42. The arrangement is such that operation of the pump 39 will force oil or other liquid from the reservoir 42 through the valve casing 37 and into the ram cylinder 22, thereby depressing the ram piston 21, adjusting head 16 and adjustable shear element 12 until the lugs 24 contact with the upper surfaces of the nuts 30. Obviously, by adjusting nuts 30 the approach of the shear 12 to the shear 11 may be correspondingly adjusted as desired. The valve 49 is adjusted to release or open when the pressure in the ram cylinder passes a predetermined point. As soon as the valve 49 is thus opened, the back pressure on the piston 45 is relieved and the valve 44 therefore also automatically opens, thus permitting the oil being pumped from the reservoir 42 to by-pass back through the pipe 43 to said reservoir and thereby preventing any further increase in such pressure.

Thus, in the normal operation of the machine the adjustable shear 12 will be forced to and held to its work by the yieldable pressure of the hydraulic ram. Should a piece of material of undue thickness or hardness be inserted between the shears 11 and 12, the reaction on the shear 12 will be transmitted to the fluid in the ram cylinder 22, thereby causing opening of the valve 49 to relieve such excessive pressure and at the same time by-pass the oil from the pump 39. Thus the normal shear operations of the machine may be conducted without danger of wrecking or overstraining the parts. When it is desired to discontinue the shear operation, the valve 51 is opened to permit escape of the oil from the ram cylinder 22 into the reservoir 42, and simultaneously opening of the valve 44, whereupon the pressure in the ram cylinder will be relieved and the oil pumped by the pump 39 by-passed back into the reservoir 42, thus permitting the springs 28 to raise the shear element 12 from cooperative relationship with the shear element 11. Upon closing of the valve 51, the oil will be forced by the pump 39 into the ram cylinder 22, thereby returning the shear element 12 to its cooperative shearing relationship. In this manner the shear element 12 may be conveniently and expeditiously operated and manipulated with perfect safety to the machine, notwithstanding any errors of the operator in inserting too thick or too hard work therein. The specific form and arrangement of parts disclosed constitutes a simple and effective one for the purpose.

While I have illustrated and described the preferred form of construction for carrying my invention into effect, this is capable of variation and modification without departing from the spirit of the invention. I, therefore, do not wish to be limited to the precise details disclosed, but desire to avail myself of such variations and modifications as fall within the scope of the appended claims.

I claim:

1. A rotary conical shear comprising a frame; rotary shear elements mounted on said frame on inclined axes and for adjustment toward and away from each other; an adjustable stop contacting directly with a shear element mounting and thus limiting the approach of said shear elements; and a hydraulic ram arranged to force said shear elements toward each other until limited by said stop.

2. A rotary shear comprising a frame; rotary shear elements mounted on said frame for adjustment toward and away from each other; a hydraulic ram arranged to adjust said shear elements; a reservoir for liquid for said ram; a pump arranged to force said liquid from said reservoir into said ram; a by-pass leading from said pump back to said reservoir; and a by-pass valve automatically operable by the pressure of said ram and arranged to open said by-pass when the pressure of said ram passes a predetermined point.

3. A rotary shear comprising a frame; rotary shear elements mounted on said frame for adjustment toward and away from each other; an adjustable stop limiting the approach of said shear elements; a hydraulic ram arranged to force said shear elements toward each other until limited by said stop; a reservoir for liquid for said ram; a pump arranged to force said liquid from said reservoir into said ram; a by-pass leading from said pump back to said reservoir; and a by-pass valve automatically operable by the pressure of said ram and arranged to open said by-pass when the pressure of said ram passes a predetermined point.

4. A rotary shear comprising a frame; rotary shear elements mounted on said frame for adjustment toward and away from each other; a hydraulic ram arranged to adjust said shear elements; a reservoir for liquid for said ram; a pump arranged to force said liquid from said reservoir into said ram; a by-pass leading from said pump back to said reservoir; a by-pass valve automatically operable by the pressure of said ram and arranged to open said by-pass when the pressure of said ram passes a predetermined point; and manually operable means for controlling the operation of said by-pass valve.

5. A rotary shear comprising a frame; rotary shear elements mounted on said frame for adjustment toward and away from each other; an adjustable stop limiting the approach of said shear elements; a hydraulic ram arranged to force said shear elements toward each other until limited by said stop; a reservoir for liquid for said ram; a pump arranged to force said liquid from said reservoir into said ram; a by-pass leading from said pump back to said reservoir; a by-pass valve automatically operable by the pressure of said ram and arranged to open said by-pass when the pressure of said ram passes a predetermined point; and manually operable means for controlling the operation of said by-pass valve.

6. A rotary shear comprising a frame; rotary shear elements mounted on said frame for adjustment toward and away from each other; a spring arrangement for forcing said shear elements away from each other; a hydraulic ram arranged to adjust said shear elements toward each other; a reservoir for liquid for said ram; a pump arranged to force said liquid from said reservoir into said ram; a by-pass leading from said pump back to said reservoir; and a by-pass valve automatically operable by the pressure of said ram and arranged to open said by-pass when the pressure of said ram passes a predetermined point.

7. A rotary shear comprising a frame; rotary shear elements mounted on said frame for adjustment toward and away from each other; a spring arrangement for forcing said shear elements away from each other; an adjustable stop limiting the approach of said shear elements; a hydraulic ram arranged to force said shear elements toward each other until limited by said stop; a reservoir for liquid for said ram; a pump arranged to force said liquid from said reservoir into said ram; a by-pass leading from said pump back to said reservoir; and a by-pass valve automatically operable by the pressure of said ram and arranged to open said by-pass when the pressure of said ram passes a predetermined point.

8. A rotary shear comprising a frame; rotary shear elements mounted on said frame for adjustment toward and away from each other; a spring arrangement for forcing said shear elements away from each other; a hydraulic ram arranged to adjust said shear elements toward each other; a reservoir for liquid for said ram; a pump arranged to force said liquid from said reservoir into said ram; a by-pass leading from said pump back to said reservoir; a by-pass valve automatically operable by the pressure of said ram and arranged to open said by-pass when the pressure of said ram passes a predetermined point; and manually operable means for controlling the operation of said by-pass valve.

9. A rotary shear comprising a frame; rotary shear elements mounted on said frame for adjustment toward and away from each other; a spring arrangement for forcing said shear elements away from each other; an adjustable stop limiting the approach of said shear elements; a hydraulic ram arranged to force said shear elements toward each other until limited by said stop; a reservoir for liquid for said ram; a pump arranged to force said liquid from said reservoir into said ram; a by-pass leading from said pump back to said reservoir; a by-pass valve automatically operable by the pressure of said ram and arranged to open said by-pass when the pressure of said ram passes a predetermined point; and manually operable means for controlling the operation of said by-pass valve.

10. A rotary shear comprising a frame; rotary shear elements mounted on said frame for adjustment toward and away from each other; a hydraulic ram arranged to adjust said shear elements; a reservoir for liquid for said ram; a pump connected with said reservoir; pipes and a valve casing connecting said pump with said ram; a by-pass pipe leading from said valve casing back to said reservoir; and a spring-held valve in said casing normally closing said by-pass and arranged to be opened automatically by excessive pressure from said pump.

11. A rotary shear comprising a frame; a stationary rotary shear element in said frame; an adjustable head carying an adjustable rotary shear element cooperating with said stationary element; guide rods for said head; compression springs arranged to force said adjustable element away from said stationary element; an adjustable stop limiting the approach of said adjustable element to said stationary element; and yieldable means for forcing and holding said adjustable element to its work.

12. A rotary shear comprising a frame; a stationary rotary shear element in said frame; an adjustable head carrying an adjustable rotary shear element cooperating with said stationary element; guide rods for said head; compression springs arranged to force said adjustable element away from said stationary element; adjustable stop nuts threaded on said guide rods and limiting the approach of said head to said stationary element; and yieldable means for forcing and holding said adjustable element to its work.

13. A rotary shear comprising a frame; a stationary rotary shear element in said frame; an adjustable head carrying an adjustable rotary shear element cooperating with said stationary element; guide rods for said head; compression springs arranged to force said adjustable element away from said stationary element; adjustable stop nuts threaded on said rods and limiting the approach of said head to said stationary element; worm wheels on the peripheries of said nuts; an adjusting shaft carrying worms meshing with said worm wheels for simultaneous adjustment of said nuts; and yieldable means for forcing and holding said adjustable element to its work.

14. A rotary shear comprising a frame; a stationary rotary shear element in said frame; an adjustable head carrying an adjustable rotary shear element cooperating with said stationary element; guide rods for said head; compression springs arranged to force said adjustable element away from said stationary element; an adjustable stop limiting the approach of said adjustable element to said stationary element; and a hydraulic ram arranged to force and hold said adjustable element to its work.

15. A rotary shear comprising a frame; a stationary rotary shear element in said frame; an adjustable head carrying an adjustable rotary shear element cooperating with said stationary element; guide rods for said head; compression springs arranged to force said adjustable element away from said stationary element; adjustable stop nuts threaded on said guide rods and limiting the approach of said head to said stationary element; and a hydraulic ram arranged to force and hold said adjustable element to its work.

16. A rotary shear comprising a frame; a stationary rotary shear element in said frame; an adjustable head carrying an adjustable rotary shear element cooperating with said stationary element; guide rods for said head; compression springs arranged to force said adjustable element away from said stationary element; adjustable stop nuts threaded on said rods and limiting the approach of said head to said stationary element; worm wheels on the peripheries of said nuts; an adjusting shaft carrying worms meshing with said worm wheels for simultaneous adjustment of said nuts; and a hydraulic ram arranged to force and hold said adjustable element to its work.

17. A rotary shear comprising a frame; rotary shear elements mounted on said frame for adjustment toward and away from each other; a hydraulic ram arranged to adjust said shear elements; a reservoir for liquid for said ram; a pump arranged to force said liquid from said reservoir; and means automatically operable when the pressure of said ram reaches a predetermined point and arranged to prevent any further passage of liquid from said reservoir to said ram while maintaining the pressure on said ram.

18. A rotary shear comprising a frame; rotary shear elements mounted on said frame for adjustment toward and away from each other; an adjustable stop limiting the approach of said shear elements; a hydraulic ram arranged to force said shear elements toward each other until limited by said stop; a reservoir for liquid for said ram; a pump arranged to force said liquid from said reservoir; and means automatically operable when the pressure of said ram reaches a predetermined point and arranged to prevent any further passage of liquid from said reservoir to said ram while maintaining the pressure on said ram.

19. A rotary shear comprising a frame; a stationary inclined rotary shear element in said frame; an adjustable head carrying an adjustable inclined rotary shear element co-operating with said stationary element; a guide for said head; yieldable means arranged to force said adjustable element away from said stationary element; an adjustable stop limiting the approach of said adjustable element to said stationary element; and yieldable means for forcing and holding said adjustable element to its work.

20. A rotary shear comprising a frame; rotary shear elements mounted on said frame for adjustment toward and away from each other; an adjustable stop contacting directly with a shear element mounting and thus limiting the approach of said shear elements, a hydraulic ram arranged to adjust said shear elements; means for supplying fluid under pressure to said ram; and means operating automatically through the pressure on said ram for relieving excessive pressure thereon at a predetermined point.

21. A rotary shear comprising a frame; rotary shear elements mounted on said frame for adjustment toward and away from each other; an adjustable stop contacting directly with a shear element mounting and thus limiting the approach of said shear elements, a hydraulic ram arranged to adjust said shear elements; a pump arranged to force liquid under pressure into said ram; and means operating automatically through the pressure on said ram for rendering said pump ineffective at a predetermined point.

G HARRY CASE.